United States Patent [19]

Chow et al.

[11] Patent Number: 5,284,718
[45] Date of Patent: * Feb. 8, 1994

[54] FUEL CELL MEMBRANE ELECTRODE AND SEAL ASSEMBLY

[75] Inventors: Clarence Y. Chow, Vancouver; David S. Watkins, Coquitlam; Kirk B. Washington, Richmond; Shiraz Ramji, North Vancouver, all of Canada

[73] Assignee: Ballard Power Systems Inc., Canada

[ * ] Notice: The portion of the term of this patent subsequent to Jan. 5, 2010 has been disclaimed.

[21] Appl. No.: 766,745

[22] Filed: Sep. 27, 1991

[51] Int. Cl.$^5$ .................. H01M 8/04; H01M 8/10
[52] U.S. Cl. .................. 429/26; 429/39; 429/41
[58] Field of Search .......... 429/35, 26, 38, 30, 429/39, 33, 40, 41, 42

[56] References Cited

U.S. PATENT DOCUMENTS 3,681,145 8/1972 Kohlmuller et al. .
4,175,165 11/1979 Adlhart .
4,279,970 7/1981 Breault et al. .
4,804,592 2/1989 Vanderborgh .

FOREIGN PATENT DOCUMENTS 0174762 3/1986 European Pat. Off. .
58-119172 7/1983 Japan .

OTHER PUBLICATIONS

"Electrode Processes And Electrochemical Engineering", Fumio Hine, approx. 1987.

*Primary Examiner*—Anthony Skapars
*Attorney, Agent, or Firm*—McAndrews, Held & Malloy, Ltd.

[57] ABSTRACT

A membrane electrode and seal assembly for an electrochemical fuel cell comprises first and second layers of porous electrically conductive sheet material, such as carbon fiber paper. The sheet material layers have a solid polymer ion exchange membrane interposed therebetween. The sheet material layers cover and support the membrane over substantially its entire surface area. The sheet material layers are coated with a catalyst to render them electrochemically active, and are bonded together with the membrane to form a consolidated assembly. Openings are formed in the layers of sheet material and the membrane to accommodate the passage of fluids through the assembly. Channels formed in the layers of sheet material generally circumscribe the openings and the electrochemically active region of the sheet material. Solid preformed gaskets are disposed in the channels. The gasketing technique can also be applied to the membrane and seal assemblies of the humidification portion of fuel cell stacks.

16 Claims, 9 Drawing Sheets

EXTERNAL LEAKAGE VS. TIME

FUEL CELL MEMBRANE ELECTRODE AND SEAL ASSEMBLY

FIELD OF THE INVENTION

This invention relates to a membrane electrode and seal assembly and, more particularly, to a gasketed sealing assembly for use in electrochemical fuel cells employing solid polymer ion exchange membranes.

BACKGROUND OF THE INVENTION

Electrochemical fuel cells employing membrane electrode assemblies are known and have been produced and sold for many years. Such cells are known as solid polymer type fuel cells and comprise, in the heart of the system, two porous electrodes separated by an electrolyte material in the form of a membrane. The porous electrodes, conveniently made from carbon fiber paper ("CFP") supporting a layer of a catalyst such as platinum, and the electrolyte material together form an assembly called a membrane electrode assembly ("MEA"). The MEA is located between two electrically conductive or, conveniently, graphite flow field plates. The graphite flow field plates supply fuel and oxidant typically in the form of hydrogen and air or oxygen, respectively, to the MEA and also act to transmit current generated by the fuel cell stack to an external electrical circuit where it may be stored or otherwise used. The fuel and oxidant are supplied to the MEA by grooves in the surface of the graphite flow field plates adjacent the carbon fiber paper. The grooves communicate with manifolds carrying gases to each of the individual MEAs.

The membrane electrode assembly includes a catalytic material, conveniently platinum as previously stated, on the surface of the CFP which renders that portion of the CFP an electrode. The electrode portion of the CFP contacts the membrane. The CFP is made hydrophobic, typically by the incorporation of polytetrafluoroethylene (tradename Teflon). Ridges between the grooves in the graphite flow field plates contact the back of the electrode portion of the CFP. The MEA consumes the fuel and oxidant through an electrochemical process and produces an electrical current which can be drawn from the electrodes to an external circuit.

To ensure that the fuel and oxidant gases supplied to the MEA do not mix, sealing to prevent such mixing is imperative. If the hydrogen and oxygen combine within the fuel cell in combination with the Catalyst, a combustible mixture can form and inflame. If the fuel and oxidant leak from the interior to the exterior of the fuel cell, the efficiency of the fuel cell can be reduced and a fire or explosive hazard created.

In conventional fuel cells, an MEA was interposed between the two electrically conductive, preferably graphite, plates. The MEA comprised a membrane bonded between the CFP layers. The membrane extended substantially beyond the edge or periphery of the CFP layers and that outer portion of the membrane was not supported by or bonded to them. The CFP layers covered only the inner or active portion of the membrane. The outer portion or periphery of the membrane was free of the CFP. The periphery of the membrane was installed between two adjacent electrically conductive plates and acted as a gasket, sealing the gases in the electrode region from the exterior, isolating the gases in their respective manifolds, and electrically insulating the electrical conducting flow field plates between which the membrane was installed.

This conventional membrane electrode assembly was disadvantageous in several respects. First, the membrane did not function well as a gasket. The membrane was subject to shrinking and swelling depending on the water content. Since it was free to shrink and swell, its potential for tearing or for developing fatigue cracks was high. Although various techniques were utilized in an attempt to minimize the leaks across the membrane between the flow field plates, the techniques were expensive and substantially ineffective over an extended time period.

Furthermore, using the unsupported outer edges of the membrane to serve as an insulator and gasket between the opposing flow field plates placed strength and resilience demands upon the membrane which limited the minimum thickness of the membrane which could realistically be used in a fuel cell. An unsupported membrane having an inadequate thickness will be prone to failure due to its expansion and contraction in operation. Such thin membranes are subject to tearing when the cell is assembled or disassembled and when the membrane electrolyte is cycled between the hydrated operating state and the dehydrated non-operating state.

Up to a point, it is desirable to reduce the thickness of the membrane electrolyte since the electrolyte represents a substantial component of the internal electrical resistance of the fuel cell. A fuel cell with a thinner electrolyte will have a lower internal resistance and thus a higher voltage will be available at the fuel cell terminals for a given current demand. This translates directly into a greater power and fuel efficiency being derived from a fuel cell with a thinner electrolyte. The advantage of greater power and fuel efficiency derived from a thinner membrane electrode is tempered only by the requirement that the membrane be sufficiently thick to sustain the operating pressure differential between the fuel and oxidant gases and to minimize the diffusional mixing of these two gas streams through the membrane.

In the conventional MEA it was also necessary to machine a recess in each flow field plate contiguous with the periphery of the CFP layers and approximately the thickness of the CFP layers. By providing such a recess, the MEA could be positioned between the flow field plates while maintaining a uniform distance about the periphery of the flow field plates. Maintaining this uniform distance allowed the membrane to be tightened appropriately between the plates so as to provide a good sealing action. However, machining such a recess was time consuming, expensive and, in fact, did not assist substantially in enhancing the sealing action.

A further disadvantage in the conventional MEA was that the membrane itself was difficult to position and maintain in position while the fuel cell stack was being assembled. This difficulty was a result of the thinness and inherent inflexibility of the membrane. This difficulty was also the result of the tendency of the membrane to expand and contract due to the humidity changes in the gases to which the membrane was subjected.

One proposed method of sealing the MEA and the adjacent electrically conductive plate without using the membrane as a gasket is to form grooves in the surfaces of the electrodes facing away from the membrane and depositing sealant material into the grooves. This proposed sealing method presents several disadvantages.

First, it has proven difficult to provide a uniform thickness of sealant material necessary for an optimal seal. Second, the sealant tends to deform in a nonuniform manner when compressed in the assembled fuel cell stack. Third, the extrudable sealant material is not sufficiently resilient to withstand compressive forces over time, and the extrudable sealant eventually deteriorates. This deterioration tends to worsen at elevated temperatures, such as those generated during fuel cell operation. The extrudable sealant material also tends to undergo chemical degradation when exposed to oxidants such as those found in fuel cells. Moreover, the use of extrudable sealant material required the machining of grooves to carry the sealant in the electrode sheet material. The machining of such grooves into the electrode portion of the membrane electrode assembly oftentimes damaged the membrane, and was also a time consuming and labor intensive task.

SUMMARY OF THE INVENTION

According to the invention, a membrane electrode and seal assembly for an electrochemical fuel cell comprises first and second layers of porous electrically conductive sheet material, each having a central portion; a membrane interposed between the first and second layers of sheet material; and first and second solid preformed gaskets. The layers of sheet material cover and support substantially the entire surface of the membrane. The layers of sheet material and the membrane have openings formed therein to accommodate the passage of fluids through the assembly. In addition, each of the layers of sheet material has channels formed therein, generally circumscribing the openings and the central portion of the layers of sheet material. The solid preformed gaskets are disposed in the channels. The channels are preferably die cut in the sheet material, but other material removal techniques could be used as well, such as water jet machining and laser machining. The sheet material having channels machined therein is generally referred to as a "stencil".

In the preferred embodiment, the membrane is a solid polymer ion exchange membrane and the sheet material comprises carbon fiber paper. Preferably, the membrane has a thickness of about 0.001 to about 0.005 inches and the gaskets have a thickness between about 0.012 and about 0.016 inches. The adhesive layer is about 0.002 inches thick, but compresses to much thinner, and has a negligible contribution to the final thickness of the membrane electrode and seal assembly.

For the membrane electrode and seal assembly in the active or electricity-generating portion of the fuel cell stack, each of the layers of sheet material further includes a catalyst, preferably platinum, disposed on the central portion thereof facing the membrane, thereby rendering that portion of the sheet material electrochemically active.

The layers of sheet material and membrane and the seals or gaskets are preferably bonded together to form a consolidated membrane electrode and seal assembly.

The fluids passing through the assembly include fuel gas, oxidant and coolant. The preferred coolants are water and ethylene glycol. The preferred material for the membranes is DuPont's NAFION brand perfluorosulfonic ion exchange membranes and Dow's experimental perfluorosulfonic ion exchange membranes for fuel cell applications, particularly those sold by Dow under the trade designation XUS 13204.10. The preferred material for the gaskets is a thermoplastic elastomer, such as SANTOPRENE brand rubber, available through Monsanto Company. The preferred adhesive is SCOTCH brand 9471 high strength laminating adhesive, available as a two-sided adhesive sheet through 3M Corporation.

A method of forming a membrane electrode and seal assembly consists of the following steps. Two layers of porous electrically conductive sheet material are provided, each having a central portion, a peripheral portion, openings formed in the peripheral portion to accommodate the passage of fluids, and a channel to accommodate a seal or gasket. As previously indicated, the sheet material layers having the gasket channel machine therein are sometimes referred to as stencils. The channel generally circumscribes the openings and the central portion of the sheet material and is interrupted by bridges. A solid polymer electrolyte or membrane is provided having openings to accommodate the passage of fluids therethrough. The membrane is bonded between the layers of sheet material to form a membrane electrode assembly. Next, the bridges are removed from the layers of sheet material. Finally, solid preformed gaskets are aligned with the channels in the sheet material and adhered to the membrane electrode assembly by the application of pressure.

In practice, an adhesive layer having a peel-off backing is first applied to the preformed gasket. The gasket/adhesive combination is mounted in a fixture and held in place by application of a vacuum. The backing is then peeled off the gasket/adhesive combination, and the stencilled channels of the membrane electrode assembly are aligned over the gasket with exposed adhesive. A second gasket/adhesive combination mounted and held by vacuum in a second fixture is aligned over the stencilled channels on the opposite side of the membrane electrode assembly.

A membrane and seal assembly may also be prepared in a similar for use in the humidification portion of a fuel cell stack. Such an assembly comprises first and second flow field plates, a water permeable membrane interposed between the flow field plates, and two solid preformed gaskets. The flow field plates and the membrane have openings formed therein to accommodate the passage of fluids through the assembly. The flow field plates also have grooves formed in the surface of the plates facing the membrane, the grooves generally circumscribing the openings. The solid preformed gaskets are disposed in the grooves.

In the preferred embodiment of the membrane and seal assembly for use in the humidification portion of the fuel cell stack, the membrane is a solid polymer electrolyte and the gaskets are formed of SANTOPRENE brand rubber. The preferred adhesive layer for bonding the gaskets to the membrane electrode assembly with stencilled channels is SCOTCH brand 9471 high strength laminating adhesive. Preferably, the flow field plates are about 0.2 inches thick, the grooves are about 0.024 inches deep, and the gaskets are each about 0.030 inches thick.

DETAILED DESCRIPTION OF THE DRAWINGS

Figure 1:
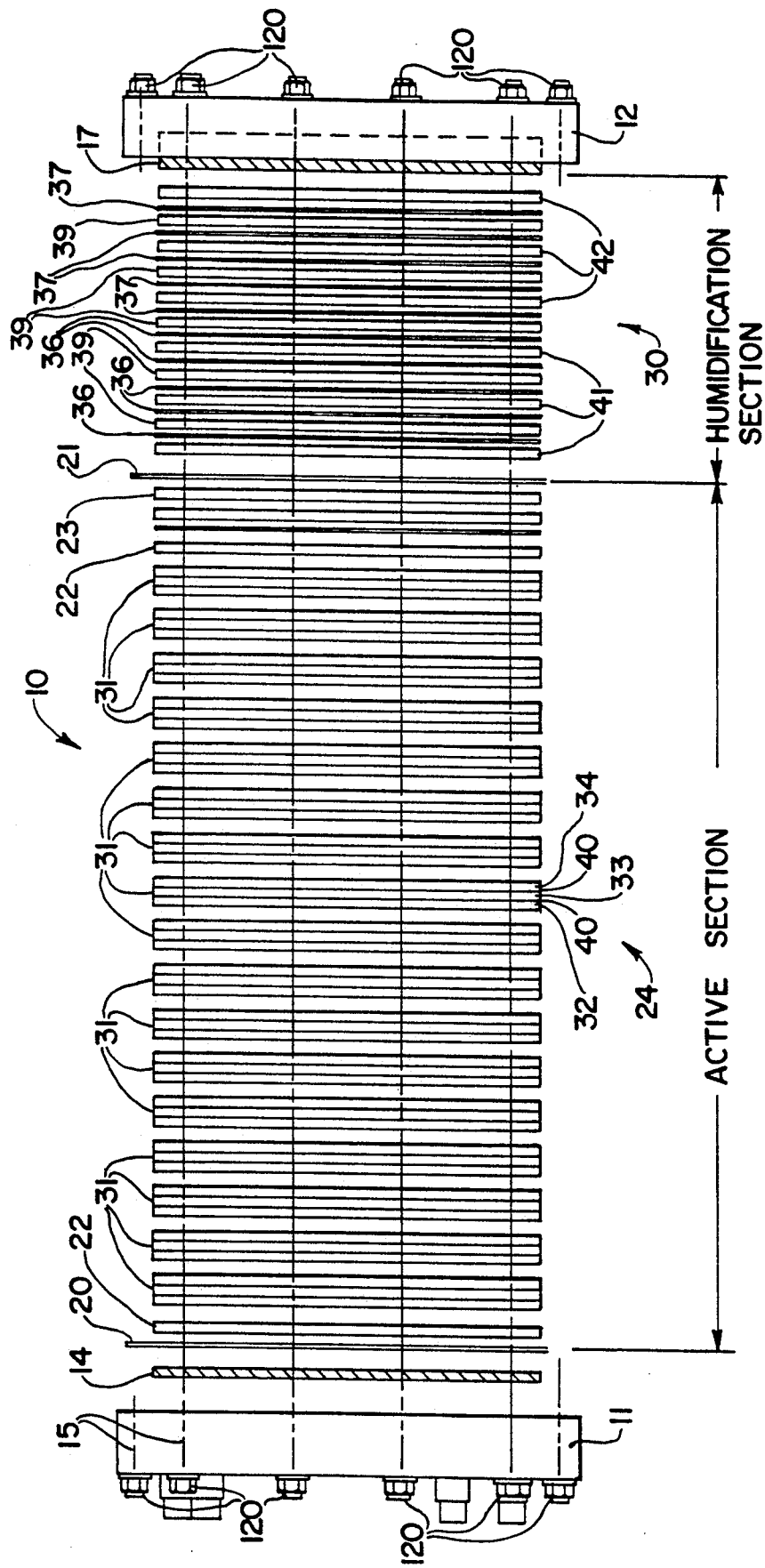
FIG. 1 is an exploded side view of the stack assembly for a fuel cell incorporating a membrane electrode and seal assembly according to the invention.

Referring now to the drawings and, in particular, to FIG. 1, a fuel cell stack assembly is generally illustrated in exploded form at 10. The stack assembly includes a pair of end plates 11, 12 which conveniently are, respectively, a fluid end plate 11 and a compression end plate 12. Plates 11 and 12 terminate the stack assembly 10, and a plurality of threaded tie rods 15 extend between the end plates 11, 12. Tie rods 15 are secured by tie rod nuts 120 to retain and hold the stack assembly 10 in its assembled condition.

An electrical isolation plate 14 is positioned inside the end plate 11. A piston 17 is positioned within the end plate 12. Bus plates 20, 21 are located on opposite ends of the stack assembly 10 as indicated and carry the voltage and current generated by the fuel cell stack 10. Cooling water jackets 22, 23 are located immediately inside the buss plates 20, 21.

The stack assembly 10 includes an "active" section, generally illustrated at 24, and a "humidification" section, generally illustrated at 30. The active section 24 includes, in addition to the bus plates 20, 21 and cooling water jackets 22, 23, a plurality of identical assemblies illustrated generally at 31. Each assembly 31 consists of three flow field plates 32, 33, 34 and two membrane electrode and seal assemblies 40 which are interposed between the flow field plates 32, 33, 34. In each assembly 31, the left-most flow field plate 32 carries the fuel in the form of hydrogen gas on one side and, optionally, coolant in channels on the opposite side. MEAs 40 are interposed between plates 32 and 33. The center flow field plate 33 carries the oxidant in the for of oxygen or air on one side and hydrogen on the opposite side. The rightmost plate 34 carries the oxidant on the side adjacent the membrane electrode and seal assembly 40 and, optionally, coolant on the opposite side. This configuration of the assembly 31 provides for the hydrogen and the oxidant to be located on opposite sides of each membrane electrode and seal assembly 40 and also provides for a coolant flow field plate to be located adjacent each membrane electrode assembly 40. This configuration is typical and extends throughout the active section 24.

The humidification section 30 of the fuel cell stack 10 includes a plurality of oxidant humidification flow field plates 41 generally located on the left hand side of the humidification section 30 illustrated in FIG. 1 and a plurality of fuel humidification flow field plates 42 generally located on the right hand side of the humidification section 30. The humidification section 30 also includes a plurality of fuel humidification membranes 37 and a plurality of oxidant humidification membranes 36 positioned between the fuel humidification flow field plates 42 and the oxidant flow field plates 41, respectively. Humidification water jacket plates 39 carry humidifying water through the humidification section 30 of the fuel cell stack.

The humidification section 30 acts to humidify the gases used in the active section of the fuel cell stack so that the solid polymer ion exchange membranes in the active section 24 remain moist or wet. In general, hydrogen ions will diffuse less readily through solid polymer ion exchange membranes if the membranes are allowed to dry. A lower rate of hydrogen diffusion will in turn reduce overall cell efficiency. The humidification section 30 is intended to prevent the membranes from drying by humidifying the fuel and oxidant gases fed to the active section 24.

The humidification section 24 also differs from the active section 30 in that there is no electricity produced in the humidification section 30 whereas in the active section 24 electricity is produced. In the active section, catalyst in the form of platinum is present on the layers of carbon fiber paper contained in the membrane electrode assemblies 40, rendering that portion of the layers of carbon fiber paper electrochemically active.

Figure 2:
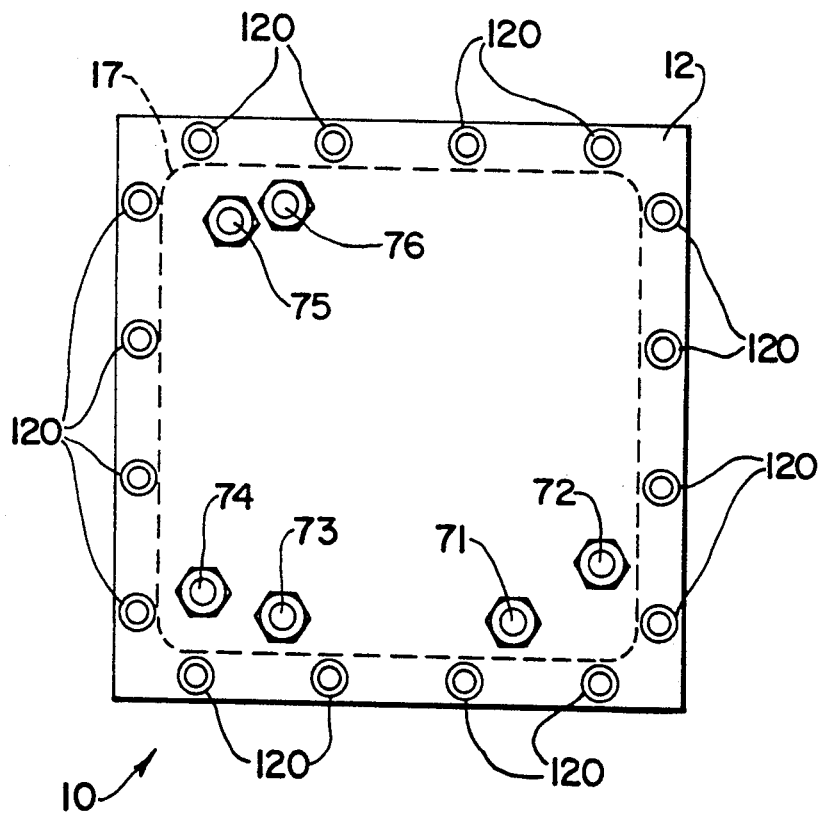
FIG. 2 is an end view of the fuel cell stack assembly illustrated in FIG. 1.

FIG. 2 is an end view of the fuel cell stack assembly 10 illustrated in FIG. 1, showing a hydrogen (fuel) gas inlet 71, a hydrogen (fuel) gas outlet 72, an air (oxidant) inlet 73, an air (oxidant) outlet 74, a water inlet 75 and a water outlet 76. FIG. 2 also shows an end plate 12, a piston 17, and tie rod nuts 120.

The membrane electrode and seal assemblies 40 in the active section 24 ar identical. A typical membrane electrode and seal is illustrated at 40 in FIGS. 3-4. Each membrane electrode and seal assembly 40 comprises five elements, namely, a first layer comprised of a porous electrically conductive sheet material, conveniently a porous carbon fiber paper 44; a second layer comprised of an electrolyte material which is a solid polymer ion exchange membrane 43; a third layer comprised of a porous electrically conductive sheet material, conveniently formed of carbon fiber paper 50; and two solid preformed gaskets 62, 63. The layers of carbon fiber paper 44, 50 support the membrane 43 therebetween to form a consolidated membrane electrode assembly or MEA. The carbon fiber paper layers 44, 50 are each treated with a catalyst 54 on the surfaces adjacent and in contact with the membrane 43, thus forming electrodes. The treated area coincides with the flow field of the flow field plates 32, 33 which carry the gases to the carbon fiber paper layers 44, 50.

A solid polymer ion exchange membrane 43 is conveniently used which has a conventional thickness of approximately 0.007 inches. This thickness was necessary to reduce tearing and other damage when the membrane is in an unsupported configuration. It is believed that a membrane of a reduced thickness can be used if the membrane is supported according to the present invention. Indeed, performance comparisons made to date indicate that, with a constant cell terminal voltage, a membrane having a reduced thickness will give enhanced current density. For example, with a membrane cell voltage of 0.6 volts, a DOW 4 membrane with a thickness of 0.0063-0.0066 exhibits a current density of approximately 2400 amperes per square foot, whereas with the same voltage, a DOW 2 membrane having a thickness of 0.0035-0.0039 provides a current density of approximately 3200 amperes per square foot, the only difference between the two membranes being one of thickness.

Figure 3:
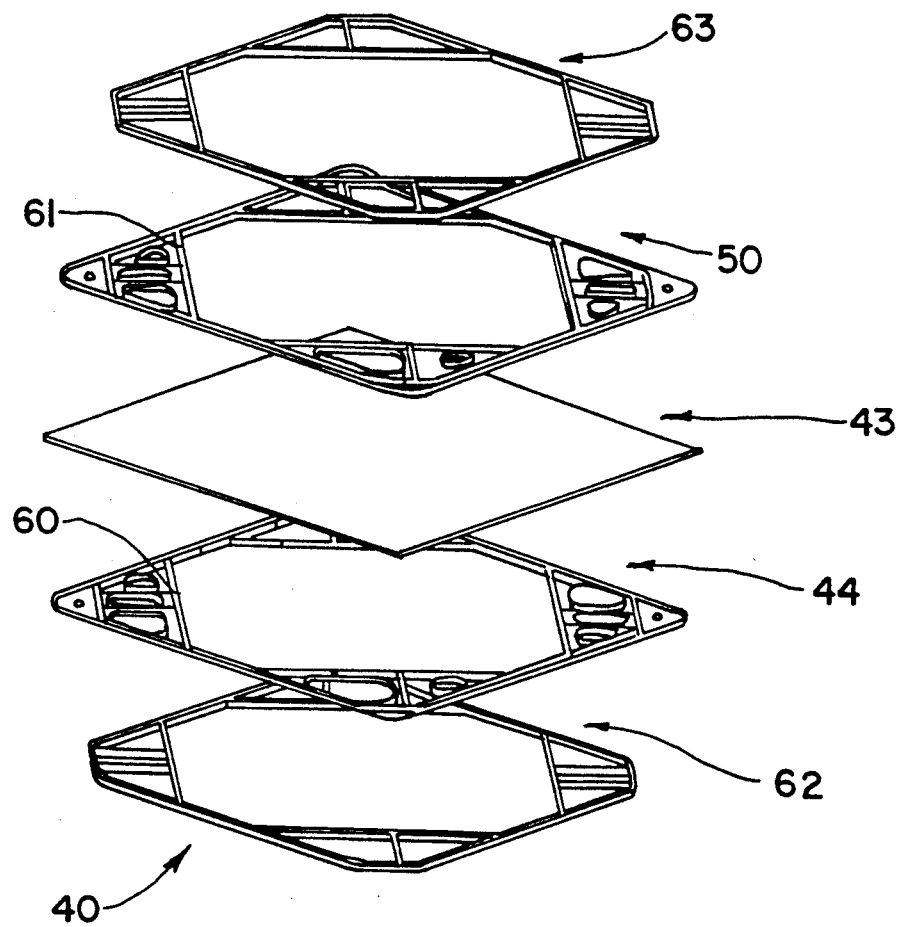
FIG. 3 is a an exploded perspective view of a membrane electrode and seal assembly according to the present invention.
Figure 4:
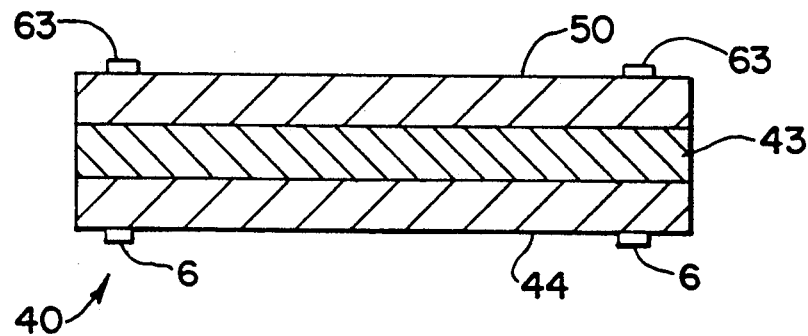
FIG. 4 is a side view of the membrane electrode and seal assembly of FIG. 3 after consolidation.

Referring to the membrane electrode and seal assembly 40 of FIGS. 3-4, the two layers of carbon fiber paper 44, 50 support the membrane 43 completely therebetween so as to form a consolidated unit. It will be particularly noted that the membrane 43 is interposed between the layers of carbon fiber paper 44, 50 over substantially all of the membrane's surface area and that the air outlet opening 51, the air inlet opening 52, the water outlet opening 111, the water inlet opening 112, the hydrogen outlet opening 113, and the hydrogen inlet opening 114 extend through not only the membrane 43 but also through the carbon fiber paper layers 44, 50.

A fuel gas, conveniently hydrogen, is supplied to the back of one of the porous electrodes (the side away from the membrane) while an oxidant such as oxygen or air is supplied to the back of the other electrode. The electrochemical process thereby carried out consumes the fuel and oxidant and produces an electric current which can then be drawn from the porous electrodes. The membrane 43 is designed to permit the diffusion of hydrogen ions through the membrane 43 while being substantially impervious to hydrogen and oxygen molecules. A catalyst 54, in the present case platinum, is added to the surface area of each of the carbon fiber paper surfaces adjacent the membrane 43. The catalyst promotes the electrochemical reaction of hydrogen and oxygen, renders the carbon fiber paper electrochemically active and thereby produces the electrical current collected at the bus plates 20, 21.

Figure 5:
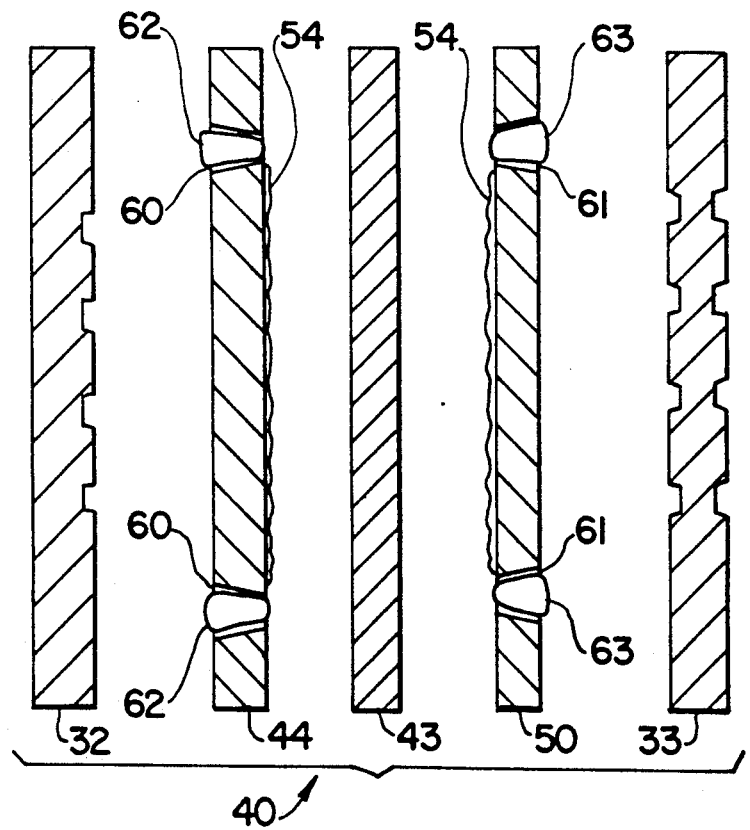
FIG. 5 is an exploded cross-sectional view of the membrane electrode and seal assembly according to the present invention, shown interposed between fluid flow field plates.
Figure 6:
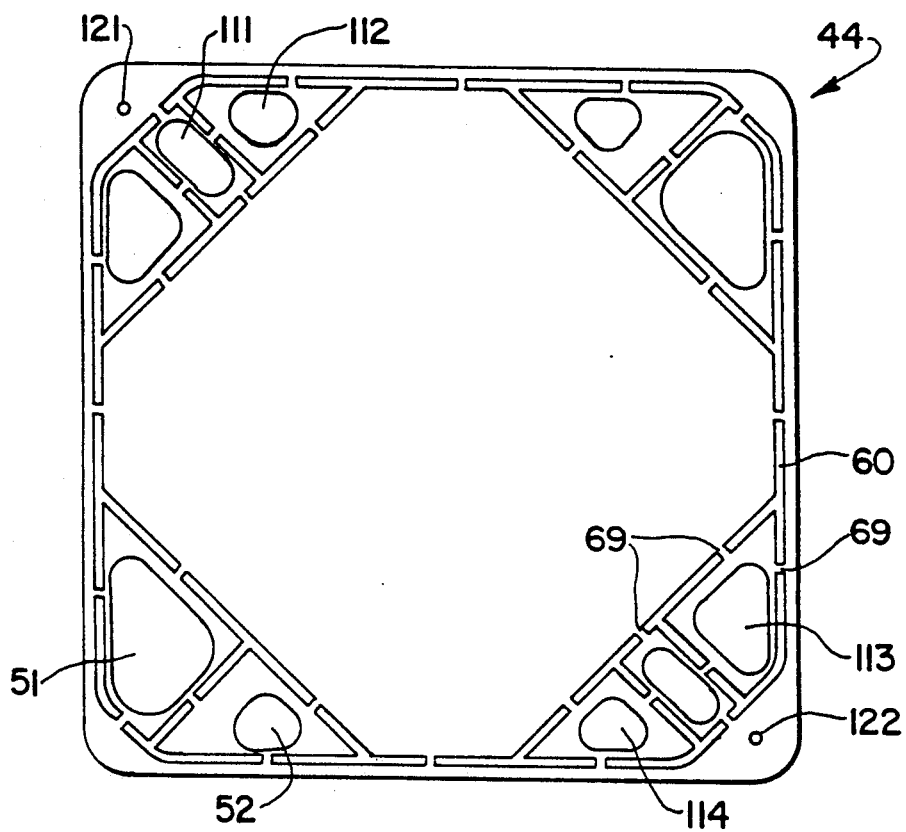
FIG. 6 is a top view of a stencilled electrode sheet material layer according to the present invention.

With reference now to FIGS. 3, 5 and 6, channels 60, 61 are formed in the layers of carbon fiber paper 44, 50, respectively, to form stencilled electrodes having channels in the surface thereof to accommodate preformed gaskets. The channels extend to each side of the membrane as illustrated in FIG. 5. Solid preformed gaskets 62, 63 are placed within the channels 60, 61, respectively, upon assembling the fuel cell stack 10.

Figure 7:
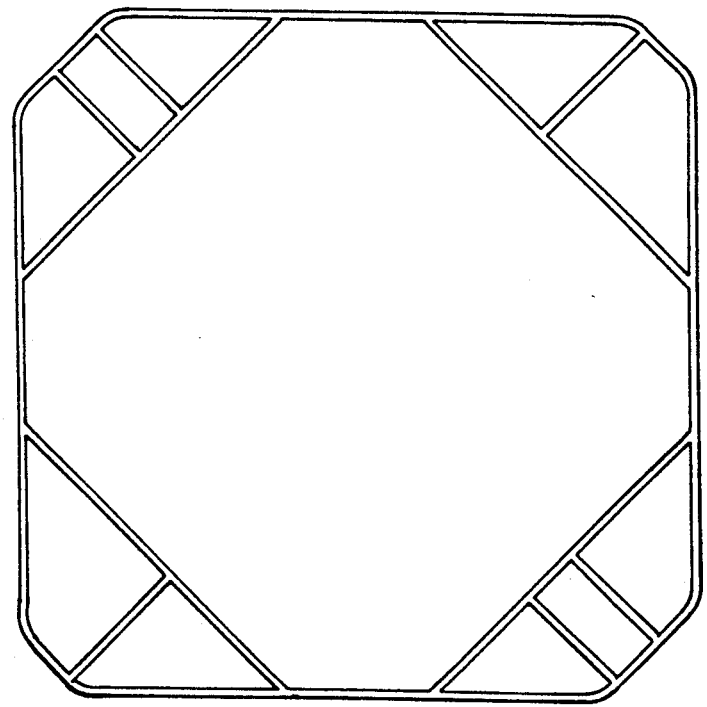
FIG. 7 is a top view of a preformed sealing gasket according to the present invention.

FIG. 7 shows a solid preformed gasket 62 suitable for use with the membrane electrode and seal assembly of FIGS. 3-4. According to the invention, a second solid preformed gasket, designated by the number 63 in FIGS. 3 and 5 and the mirror image of the first solid preformed gasket 62, is disposed on the opposite side of the membrane 43. Both gaskets 62, 63 are configured to generally circumscribe the fluid passage openings 51, 52, 111, 112, 113, 114 and the electrochemically active portion of the membrane 43.

The preferred material for the gaskets 62, 63 is SANTOPRENE brand elastomer because of its chemical compatibility with the fuel cell stack components and its stability under compression. In particular, this material exhibits good compression set in that it does not appreciably reduce in thickness under pressure over time. SANTOPRENE brand rubber is available in sheets comprising a layer of SANTOPRENE brand rubber having adhesive on one side with a paper backing that can be readily removed. To manufacture a solid preformed gasket, a sufficient amount of gasket material is placed under a metal die which is used to punch out the gasket. The gaskets used in the electrochemically active portion of the fuel cell stack are preferably about 0.012 to about 0.016 inches thick. The gaskets used in the humidification portion of the fuel cell stack ar preferably about 0.030 inches thick.

Catalyst, typically a platinum based/compound, is applied to the carbon fiber paper electrodes 44, 50 to render them electrochemically active. The electrodes 44, 50 are die cut to form the coolant, oxidant and fuel inlet and outlet openings (represented by openings 51, 52, 111, 112, 113 and 114 in FIG. 6), the guide pin holes 121, 122 used for assembly purposes, and the sealing grooves or channels 60, 61 to accommodate the solid preformed gaskets. Bridges or tabs 69 are left in the channels at various points to keep each stencilled layer of carbon fiber paper in a single piece. Preferably, the bridges in one stencilled electrode are offset from the bridges in the other stencilled electrode. In this way, the bridges tend not to bond with the membrane when the stencilled electrodes and membrane are pressed together because the offset bridges do not undergo sufficient bonding pressure to adhere to the membrane. In the preferred embodiment, the bridges are about 0.10 inches wide.

Next, the carbon fiber paper electrodes 44, 50 are consolidated with a solid polymer ion exchange membrane 43 to form a membrane electrode assembly. The layers of carbon fiber paper 44, 50 are bonded to the membrane 43 by the application of heat and pressure. The bonding process involves placing the membrane electrode assembly in a press at a temperature and pressure sufficient to consolidate the assembly. Further cooling completes the bonding process.

The bridges 69 are then removed from the channels 60, 61 in the layers of carbon fiber paper 44, 50 using a knife or other appropriate tool. Care is taken not to damage the membrane 43 during this step.

Next, a second die is used to cut openings in the membrane 43 corresponding to the coolant, oxidant and fuel inlet and outlet openings an guide pin holes in the carbon fiber paper electrodes 44, 50.

Finally, the solid preformed gaskets 62, 63 are added to the membrane electrode assembly. The gaskets 62, 63 are each placed adhesive side up in an assembly fixture and held in place by vacuum pressure. The membrane electrode assembly is installed into another fixture by aligning the guide pin holes 121, 122 located in diagonally-opposite corners of the membrane electrode assembly with guide pins located on the fixture. The fixtures are oriented such that the gaskets 62, 63 are aligned with the channels 60, 61 in the carbon fiber paper electrodes 44, 50. The fixtures holding the gaskets 62, 63 are then each in turn pressed against the fixture holding the membrane electrode assembly by the application of hand pressure to affix the seal or gasket to the membrane electrode assembly. The entire assembly, including the membrane electrode assembly and the two gaskets, may be referred to as a membrane electrode and seal assembly, or gasketed MEA.

The fuel cell stack 10 is then assembled by using the guide pin holes 121, 122 as guides for guide pins. The various components are stacked together and, when assembled, the nuts 120 (see FIG. 1) on the ends of the tie rods of fuel cell stack 10 are torqued to apply suitable compressive force.

Figure 8:
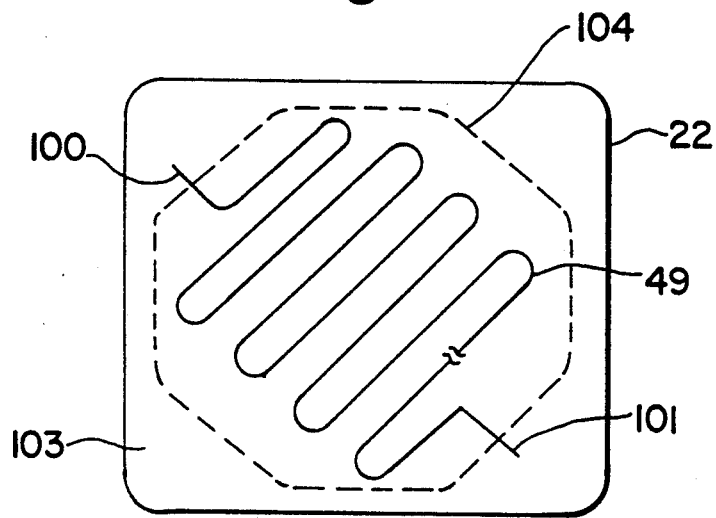
FIG. 8 is a front diagrammatic view of a cooling water jacket.
Figure 9:
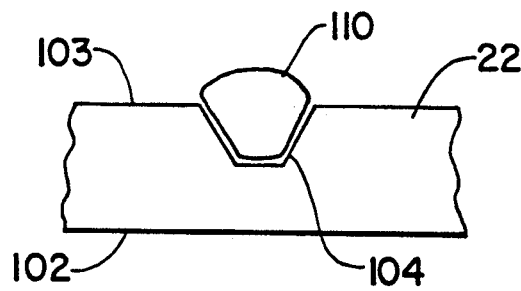
FIG. 9 is an enlarged cross-sectional view of the sealing groove in the cooling water jacket of FIG. 8.

As noted above and shown in FIG. 1, cooling water jackets 22, 23 are located immediately inside the bus plate 20, 21 and adjacent to the flow field plates 32, 34 in the fuel cell stack 10. A cooling water jacket 22 is illustrated in FIGS. 8 and 9. One side 102 of the plate 22 is blank. The opposite side 103 has a plurality (typically ten) of liquid carrying grooves formed therein to carry the coolant, preferably water, from the coolant inlet 100 to the coolant outlet 101, although only one groove 49 is illustrated in FIG. 8 for simplicity. In addition, a plurality of openings (not shown) extend through the plate 22 to allow for passage of the hydrogen and the air or oxidant through the plate 22.

The cooling water jacket 22 is mounted against the blank side of the flow field plate 32 (see FIG. 1). To that end, it is necessary to seal the plate 22 against the blank side of flow field plate 32 to prevent the escape of water. Reference is made to sealing groove 104 in FIGS. 8 and 9 in which a solid preformed gasket 110 is disposed. Groove 104 is machined in the cooling water jacket 22 and a solid preformed gasket 110 is placed into the sealing groove 104 during assembly of the fuel cell stack 10 but prior to assembling the cooling water jacket 22 against the flow field plate 32.

Figure 10:
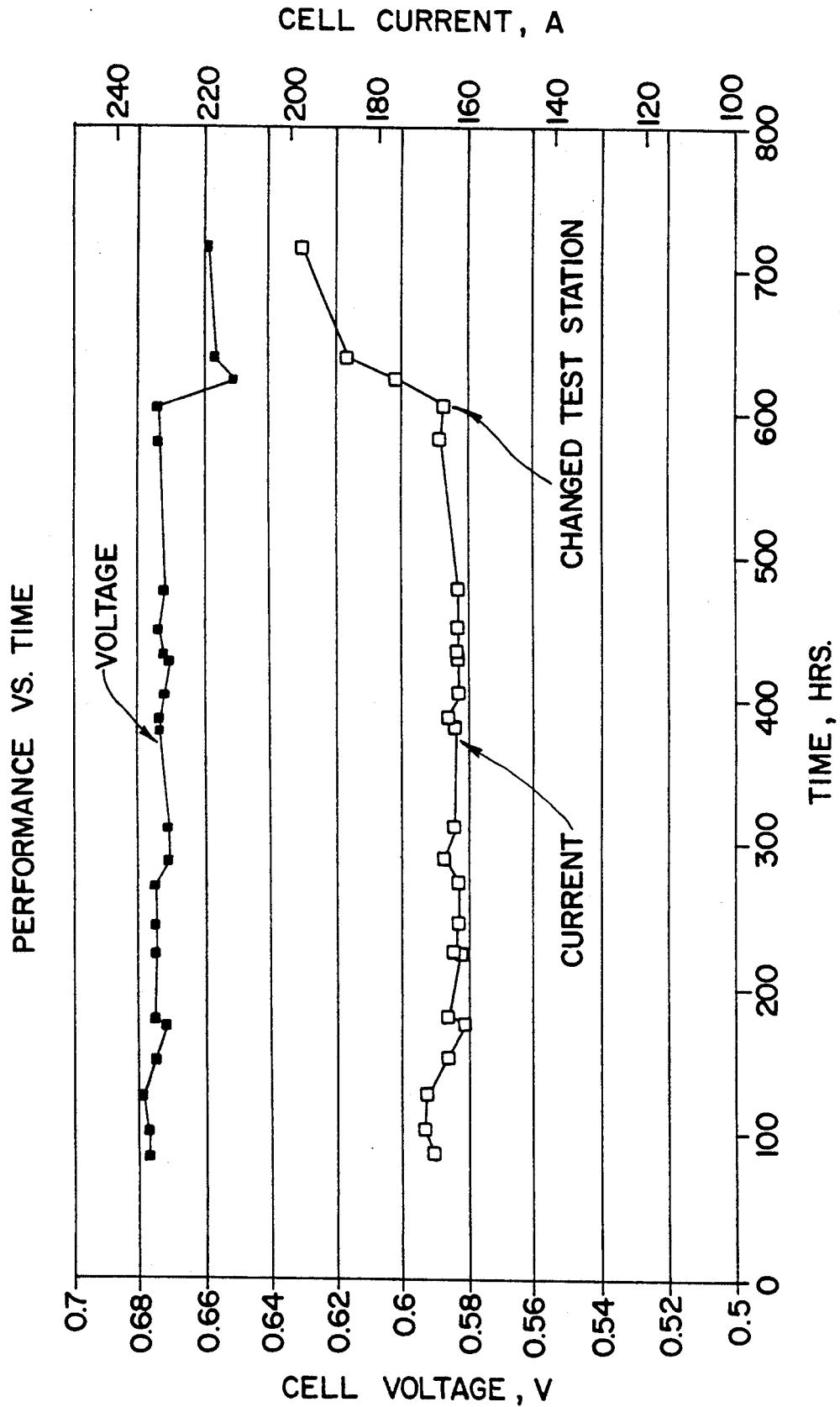
FIG. 10 is a graph of the performance data for a fuel cell stack comprising membrane electrode and seal assemblies of the present invention.

Performance data for a fuel cell stack comprising membrane electrode and seal assemblies according to the present invention are provided in FIG. 10. As FIG. 10 shows, such a fuel cell stack was operated for about 600 hours at a voltage of about 0.67–0.68 volts, producing a current of about 0.58–0.59 amperes. After 600 hours of constant operation, the test station was changed, decreasing the voltage to about 0.66 volts and increasing the current to about 0.64 amperes.

Figure 11:
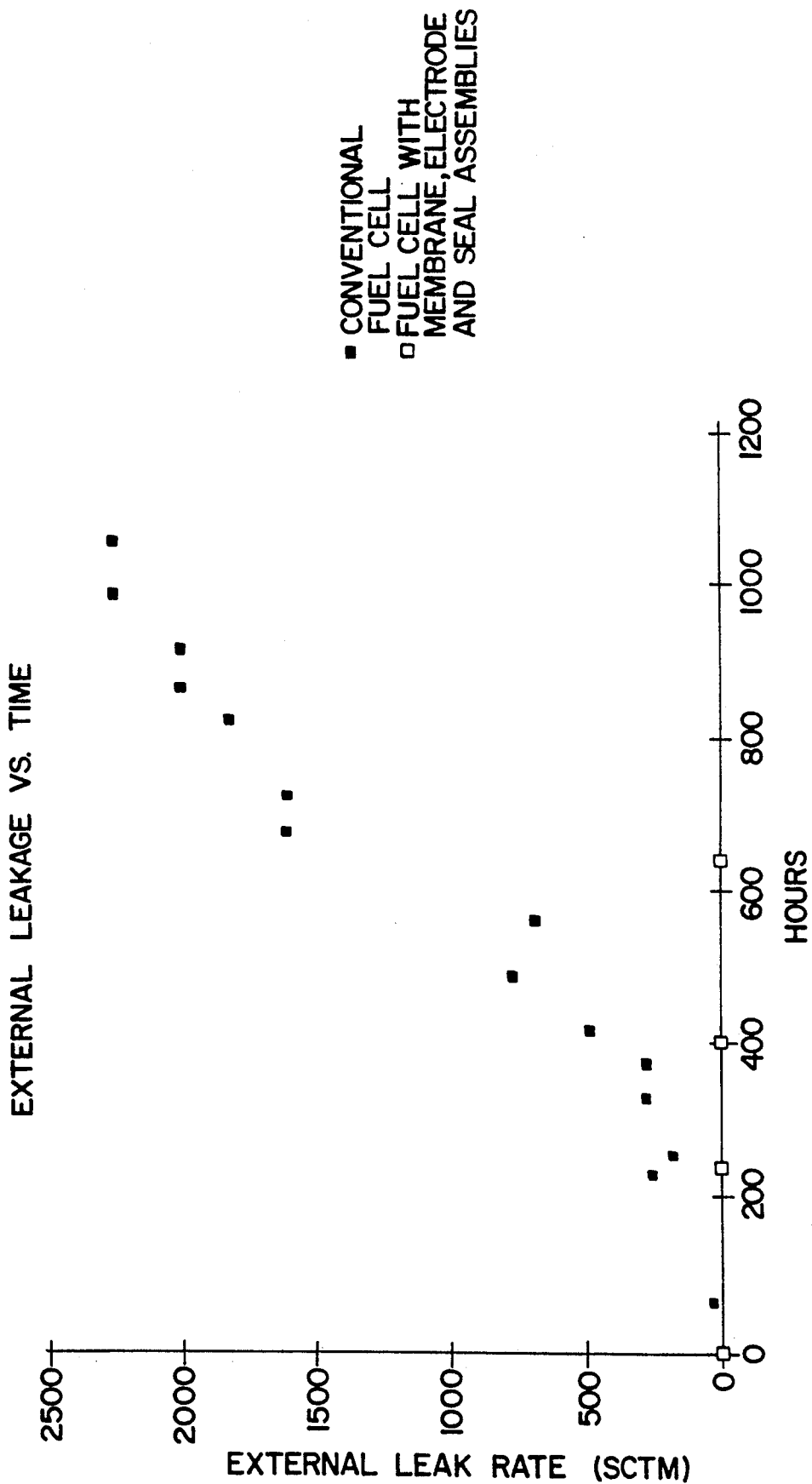
FIG. 11 is a graph comparing the performance of a fuel cell stack comprising membrane electrode and seal assemblies according to the present invention and a fuel cell stack comprising membrane electrode assemblies of an older, extruded sealant type.

FIG. 11 provides a comparison of the performance of a fuel cell stack comprising membrane electrode and seal assemblies according to the present invention and a fuel cell stack comprising membrane electrode assemblies of an older, extruded sealant type. The fuel cell stack comprising the older type membrane electrode assemblies exhibited external leakage of gases soon after start-up. Cumulative leakage reached about 2300 standard cubic centimeters (SCCM) after about 1000 hours of operation.

By contrast, a fuel cell stack comprising membrane electrode and seal assemblies according to the present invention exhibited no external leakage after approximately 700 continuous hours of operation. In a single fuel cell, no external leakage was observed after approximately 1100 hours.

In addition to employing the membrane electrode and seal assembly in the electrochemically active portion of the fuel cell stack, a membrane and seal assembly can be used in the humidification portion of the fuel cell stack. In the humidification portion of the fuel cell stack, an unsupported membrane can be used in place of the supported membrane. In the preferred embodiment, there are no layers of carbon fiber paper to support the membrane. Instead, the unsupported membrane is interposed between fluid flow plates. Sealing grooves are formed in the surfaces of the fluid flow plates facing the membrane, circumscribing the fluid inlet and outlet holes and the portion of the membrane used for humidification. Solid preformed gaskets are disposed in the sealing grooves.

Figure 12:
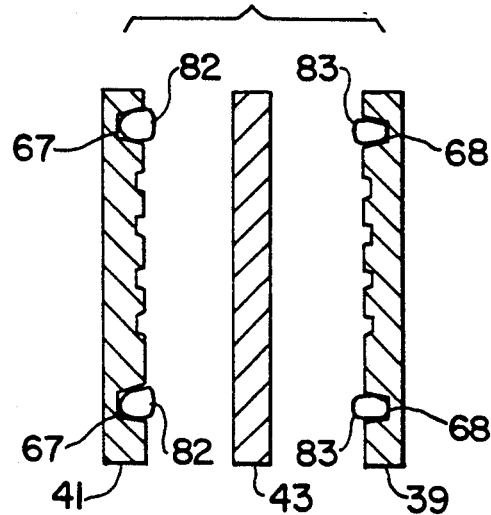
FIG. 12 is an exploded cross-sectional view of a membrane and seal assembly according to the present invention for use in the humidification portion of a fuel cell stack.

This preferred embodiment of a membrane and seal assembly for the humidification portion of the fuel cell stack is shown in FIG. 12. A membrane 43 is interposed between fluid flow plates, in this instance an oxidant humidification flow field plate 41 and a humidification water jacket 39. Sealing grooves 67, 68 are formed in the surfaces of the oxidant humidification flow field plate 41 and the humidification water jacket 39, respectively. Solid preformed gaskets 82, 83 are disposed in the sealing grooves 67, 68.

Preferably, the humidification water jacket and the fluid flow plate are about 0.2 inches thick, the grooves are about 0.026 inches deep, and the gaskets are about 0.030 inches thick. These relative dimensions insure good sealing action.

Alternatively, a fully supported membrane and seal assembly can also be employed in the humidification portion of a fuel cell stack. For ease of manufacture, the membrane and seal assembly in the humidification portion can be formed of the same membrane and conductive sheet material (preferably carbon fiber paper) as that used in the electrochemically active portion. In the humidification portion, however, the carbon fiber paper is generally not coated with catalyst.

Figure 13:
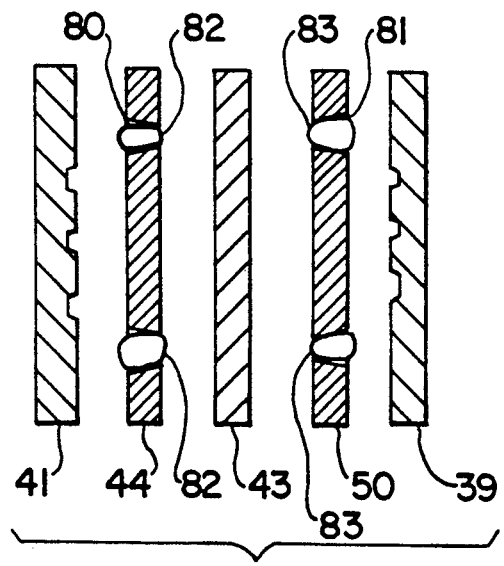
FIG. 13 is an exploded cross-sectional view of a second embodiment of a membrane and seal assembly according to the present invention, shown interposed between fluid flow field plates.

FIG. 13 illustrates a membrane and seal assembly for the humidification portion of a fuel cell stack. The water vapor exchange membrane 43 is interposed between layers of carbon fiber paper 44, 50. As with the membrane electrode and seal assembly for the electrochemically active portion of the fuel cell stack, channels 80, 81 are formed in the layers of carbon fiber paper. Solid preformed gaskets 82, 83 are disposed in the channels. In the illustrated embodiment, the entire membrane and seal assembly is interposed between an oxidant humidification flow field plate 41 and a humidification water jacket plate 39.

Many further modifications will readily occur to those skilled in the art to which the invention relates. The specific embodiments described herein should be taken as illustrative of the invention only and not as limiting its scope in accordance with the accompanying claims.

What is claimed is:

1. A membrane electrode and seal assembly for an electrochemical fuel cell comprising:
    first and second layers of porous electrically conductive sheet material, each having a central portion;
    a membrane interposed between said first and second layers of sheet material; and
    first and second preformed gaskets;
    wherein said layers of sheet material cover and support substantially the entire surface of said membrane; said layers of sheet material and said membrane have openings formed therein to accommodate the passage of fluids through said assembly; each of said layers of sheet material having channels formed therein, said channels circumscribing said openings and said central portion; said first and second preformed gaskets being disposed in said channels.

2. The membrane electrode and seal assembly of claim 1 wherein said membrane is a solid polymer ion exchange membrane.

3. The membrane electrode and seal assembly of claim 2 wherein said sheet material comprises carbon fiber paper.

4. The membrane electrode and seal assembly of claim 2 wherein said membrane has a thickness between about 0.001 and about 0.005 inches.

5. The membrane electrode and seal assembly of claim 4 wherein said gaskets have a thickness between about 0.012 and about 0.016 inches.

6. The membrane electrode and seal assembly of claim 1 wherein each of said layers of sheet material further includes a catalyst disposed on the central portion of said sheet material facing said membrane, said layers of sheet material rendered electrochemically active in the portion containing said catalyst.

7. The membrane electrode and seal assembly of claim 6 wherein said catalyst comprises platinum.

8. The membrane electrode and seal assembly of claim 6 wherein said layers of sheet material and said membrane are bonded together to form a consolidated membrane electrode assembly, and said first and second solid preformed gaskets are adhered to said consolidated membrane electrode assembly to form a consolidated membrane electrode and seal assembly.

9. The membrane electrode and seal assembly of claim 6 wherein said fluids include fuel gas, oxidant and coolant.

10. The membrane electrode and seal assembly of claim 9 wherein said fuel gas comprises hydrogen, said oxidant comprises oxygen-containing air, and said coolant is fluid selected from the group consisting of water and ethylene glycol.

11. The membrane electrode and seal assembly of claim 1 wherein said gaskets are formed from a solid thermoplastic elastomeric material.

12. A membrane and seal assembly for the humidification section of an electrochemical fuel cell comprising:
first and second flow field plates;
a water permeable membrane interposed between said first and second flow field plates; and
first and second preformed gaskets;
wherein said first and second flow field plates and said membrane have openings formed therein to accommodate the passage of fluids through said assembly; each of said first and second flow field plates has grooves formed in the surface facing said membrane, said grooves circumscribing said openings; and said first and second solid preformed gaskets are disposed in said grooves.

13. The membrane and seal assembly of claim 12 wherein said membrane is a solid polymer ion exchange membrane.

14. The membrane and seal assembly of claim 12 wherein said gaskets are formed from a solid thermoplastic elastomeric material.

15. The membrane and seal assembly of claim 14 wherein said first and second flow field plates are about 0.2 inches thick, said grooves are about 0.026 inches deep, and said gaskets are about 0.03 inches thick.

16. A membrane and seal assembly for the humidification section of an electrochemical fuel cell comprising:
first and second layers of porous sheet material;
a water permeable membrane interposed between said first and second layers of porous sheet material; and
first and second solid preformed gaskets;
wherein said layers of sheet material and said membrane have openings formed therein to accommodate the passage of fluids through said assembly; each of said layers of sheet material has channels formed therein, said channels substantially circumscribing said openings; and said first and second solid preformed gaskets are disposed in said channels.

* * * * *